United States Patent
Hodebourg

(10) Patent No.: US 9,404,585 B2
(45) Date of Patent: Aug. 2, 2016

(54) FLUID CIRCULATION VALVE

(71) Applicant: Valeo Systemes de Controle Moteur, Cergy Saint Christophe (FR)

(72) Inventor: Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/381,789

(22) PCT Filed: Feb. 19, 2013

(86) PCT No.: PCT/FR2013/050343
§ 371 (c)(1),
(2) Date: Aug. 28, 2014

(87) PCT Pub. No.: WO2013/135985
PCT Pub. Date: Sep. 19, 2013

(65) Prior Publication Data
US 2015/0014566 A1    Jan. 15, 2015

(30) Foreign Application Priority Data
Mar. 12, 2012 (FR) ................. 12 52193

(51) Int. Cl.
*F16K 1/20* (2006.01)
*F16K 1/226* (2006.01)
*F16K 11/052* (2006.01)

(52) U.S. Cl.
CPC ............ *F16K 1/2042* (2013.01); *F16K 1/2057* (2013.01); *F16K 1/2263* (2013.01); *F16K 11/052* (2013.01); *F16K 11/0525* (2013.01); *Y02T 10/121* (2013.01)

(58) Field of Classification Search
CPC . F16K 1/2042; F16K 11/0525; F16K 1/2057; F16K 11/052; F16K 1/2263; F02M 25/0793; Y02T 10/121
USPC ............. 251/305–308, 286–288, 298; 123/568.18, 568.21, 41.4
See application file for complete search history.

(56) References Cited

U.S. PATENT DOCUMENTS 5,333,838 A * 8/1994 Garcia-Mallol ........ F16K 1/222
                                                                     110/263
5,741,006 A * 4/1998 Murai ..................... F16K 1/221
                                                                     251/305

(Continued)

FOREIGN PATENT DOCUMENTS

| DE | 24 27 995 A1 | 1/1976 |
| FR | 2 933 469 A1 | 1/2010 |
| FR | 2 962 182 A1 | 1/2012 |

OTHER PUBLICATIONS

International Search Report for International Application No. PCT/FR2013/050343, mailed Apr. 24, 2013 (2 pages).

*Primary Examiner* — John Bastianelli
(74) *Attorney, Agent, or Firm* — Osha Liang LLP

(57) ABSTRACT

A fluid circulation valve has a body delimiting an internal duct and a flap mounted pivotally on a spindle separating the flap into a first part and a second part. The flap is able to pivot between an open position allowing the fluid to pass into the duct, and a closed position which prevents the passage and for which the second part of the flap comes to rest against a seal which extends facing this second part, and which further seals the body of the valve. The seal has pressure-lowering means downstream of the second part of the flap so as to increase the force for clamping the second part against the seal.

10 Claims, 2 Drawing Sheets

(56) References Cited

U.S. PATENT DOCUMENTS

Figure 1:
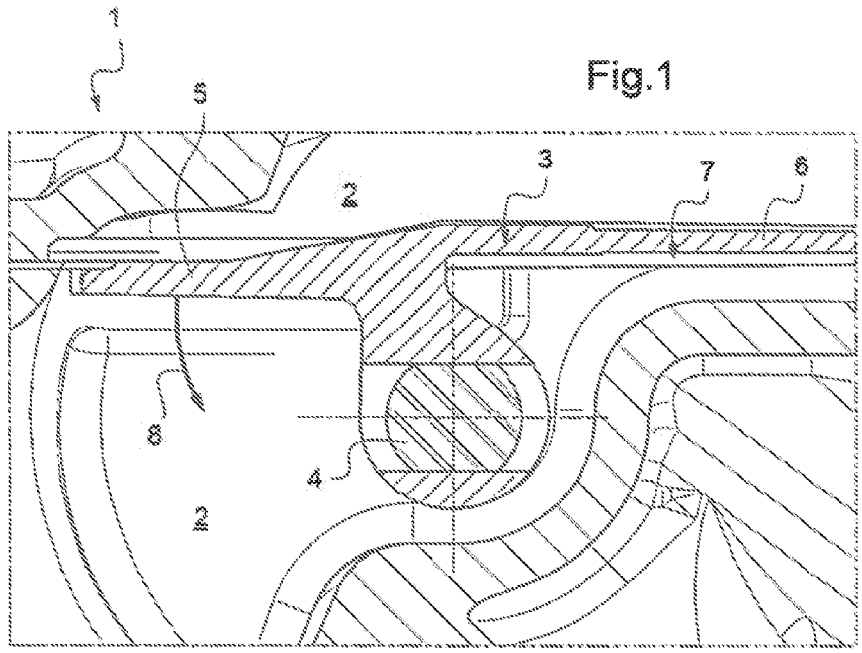

| | | | | |
|---|---|---|---|---|
| 7,264,221 B2* | 9/2007 | Yeary | ............... | F16K 1/22 123/337 |
| 8,162,004 B2* | 4/2012 | Albert | ............... | F02M 25/0719 137/340 |
| 8,627,806 B2* | 1/2014 | Festor | ............... | F02M 25/0719 123/41.4 |
| 2006/0038151 A1* | 2/2006 | Nakamura | ............ | F02D 9/1045 251/305 |
| 2007/0063163 A1* | 3/2007 | Yeary | ............... | F16K 1/22 251/305 |
| 2011/0155110 A1* | 6/2011 | Festor | ............... | F02M 25/0719 123/568.11 |
| 2013/0146038 A1* | 6/2013 | Adenot | ............... | F02M 25/0793 123/568.11 |

* cited by examiner

FLUID CIRCULATION VALVE

The invention relates to a fluid circulation valve. This type of valve may for example be fitted in a gas supply line of a combustion engine of a vehicle, for controlling the flow rate of EGR (Exhaust Gas Recirculation) gases in a loop by means of which it is possible to bleed a portion of the exhaust gases leaving the engine, such that they may be re-injected upstream of said engine. The operational principle of this type of valve is based on the controlled rotation of a flap which may move from a fully open position, in order to allow the fluid to pass through, to a closed position, in order to block this passage. The invention relates to an improved fluid circulation valve.

A fluid circulation valve thus has a flap which is mounted pivotably on a rotation spindle, such that said spindle separates the flap into a first part and a second part. When this flap is in a closed position, the second part of said flap comes into contact with a seal, wherein furthermore the seal:
 seals the valve body at the first and second parts of the flap,
 acts as a stop for positioning said flap.

One example of such a valve is described in FR 2962182.

One problem frequently encountered with this type of valve in the fully closed position is that the first part of the flap experiences a pressure difference between its two sides, which is due to the presence of the fluid upstream of the flap while, at the same time, the pressure acting on either side of the second part of said flap remains constant. This then forcibly opens the first part of the flap under the pressure of the fluid, while the second part of the flap remains immobile and in contact with the seal. This unwanted opening thus allows a small amount of fluid to pass through, while said valve is in the closed position, this unplanned passage of the gases rendering said valve unreliable and impairing the performance of the fluid line in which said valve is fitted.

A fluid circulation valve according to the invention has undergone a structural modification with respect to the valve described in FR 2962182, with the aim of modifying the pressure conditions acting on the flap, such that said flap blocks off the fluid line in a fluid-tight manner when the valve is in a closed position. This structural arrangement improves the performance of the valve, and makes it more reliable and more secure, at the point of closing the fluid line.

The invention relates to a fluid circulation valve, having a body delimiting an internal duct and comprising a flap mounted pivotably on a spindle separating said flap into a first part and a second part, said flap being able to pivot between an open position allowing the fluid to pass into the duct, and a closed position which prevents said passage and for which the second part of said flap comes to rest against a seal which extends facing this second part, and which further seals the body of the valve. The seal has pressure-lowering means downstream of the second part of the flap so as to increase the force for clamping said second part against said seal.

The invention also relates to a fluid circulation valve, having a body delimiting an internal duct and comprising a flap mounted pivotably on a spindle separating said flap into a first part and a second part, said flap being able to pivot between an open position allowing the fluid to pass into the duct, and a closed position which prevents said passage and for which the first and the second part of said flap come to rest against a seal which extends facing this first and second part, said seal further sealing the body of the valve. The seal has pressure-lowering means downstream of the second part of the flap so as to increase the force for clamping said second part against said seal.

Indeed, for an existing valve, when the flap is in the closed position, the pressures acting on either side of the second part are substantially equal while the first part of said flap experiences an upstream pressure which is higher than the downstream pressure, because of the presence of the fluid. The main consequence of such a balance of pressures is that the first part of the flap tends to open, allowing a small quantity of fluid to escape into the duct.

The valve may be an exhaust gas recirculation valve for a gas supply line of a motor vehicle combustion engine.

The valve may be a valve positioned in the intake line of the combustion engine, in the exhaust line of the combustion engine, or in an exhaust gas recirculation loop by means of which the exhaust gases may be re-injected at the combustion engine intake. This recirculation loop may be "low-pressure" or "high pressure".

The valve is in particular a "two-way" valve.

As a variant, the valve may be a "three-way" valve. The valve may then be arranged at the inlet to the recirculation loop, that is to say at that point of the exhaust line where the recirculation loop starts. The "three-way" valve may, as a variant, be arranged at the outlet of the recirculation loop, that is to say at that point of the intake line where the exhaust gases are re-injected into the intake.

The pressure-lowering means may comprise an opening created in the seal. The purpose of this opening is to create a pressure drop downstream of the second part of the flap, so as to cause said second part to move counter to the movement of the first part. In this way, the first and second part experience forces in the opposite direction, which will cancel each other out, thus avoiding the unwanted opening of the flap. The flap does not deform and blocks off the fluid line in a perfectly fluid-tight manner.

The opening created in the seal may be only facing the second part of the flap when the flap is in the closed position.

The seal may comprise two openings, specifically a first opening facing the first part of the flap and allowing the fluid to pass into the duct when the flap is in the open position, and a second opening facing the second part of the flap and allowing a pressure drop downstream of the second part of the flap when the flap is in the closed position, and which is then the opening described hereinabove and created in the pressure-lowering means.

The surface area of the first opening may be greater than that of the second opening.

The opening created in the seal may be considered similar to a hole through said seal.

Advantageously, the two parts of the flap are planar and mutually continuous, the seal being planar.

When this flap is in a closed position, the first part and the second part of said flap may each come into contact with the seal of the valve, said seal then acting as a stop for positioning said flap.

When this valve is in a closed position, the first part of the flap may come into contact with the seal of the valve via a first surface and the second part of the flap may come into contact with the seal of the valve via a second surface, the first and second surface being opposite surfaces of the flap.

For such a configuration, the contact surface between the first and the second part of the flap and the seal may be distributed so as to ensure a fluid-tight contact between said first and said second part of the flap and the internal structure of the valve, specifically the seal, when the flap is in the closed position.

Preferably, the opening is created within the seal without opening onto one of the edges of said seal. In this manner, the seal will have less of a tendency to deform under pressure and will be able to retain its initial shape. Indeed, were the opening to open onto one of the edges of the seal, the two parts of said seal surrounding the opening might spread apart under the effect of the pressure, and the seal would then be rendered ineffective.

Advantageously, the second part of the flap and the seal are rectangular in shape, the opening being rectangular in shape. This is an embodiment of simple design and one which perfectly addresses the problem posed relating to balancing the pressures acting on the flap.

The ratio of the surface area of the opening to the total surface area of the seal is preferably between 0.1 and 0.5. Indeed, the opening must not be too big, lest it cause a deformation of the annular seal which could then lose its sealing and cushioning function with respect to the flap. At the same time, if the opening is too small, it will have no effect on the balance of pressures acting on the flap.

The opening may be in a central position in the part of the seal which faces the second part of the flap when the latter is in the closed position.

Advantageously, the seal has a cavity and the opening is created in said cavity. This cavity may be considered similar to a rib, and the fact that the opening is created inside this cavity will increase the surface area of the pressure drop created in this way by said opening, and will help close the flap in a particularly fluid-tight manner.

The second part of the flap preferably pivots along a wall of the internal structure of the valve when said flap moves in rotation, said wall being designed to leave a clearance J, with respect to said second part, which is less than or equal to 1.5 mm. Usually, on existing valves, this clearance is large, being of the order of 4 mm. With such a clearance, when the flap is in a slightly open position, corresponding to a position close to the closed position, the gases may easily pass through this large clearance and cancel the pressure drop effect generated by the opening created in the seal since the pressure will quickly balance out on either side of the second part of the flap due to the gases passing through said clearance. Thus, in order to maintain this pressure drop effect generated by the opening in the seal for small openings in the flap, one solution consists in minimizing the clearance that remains between the second part of the flap and the wall of the internal structure of the valve, along which said second part will move in rotation. It is to be noted that a clearance must exist in order to avoid choking the engine when the flap is in a fully open position.

The clearance is advantageously between 0.1 mm and 1.5 mm.

The clearance is preferably between 0.2 mm and 0.6 mm.

The valves according to the invention have the advantage of having high performance in terms of sealing, not by adding a part but by a judicious removal of material in the internal structure of said valves, which does not impair the operation of the latter. This results in these valves having an additional functionality by virtue of this increased sealing, while still being of the same external size. The valves according to the invention have the advantage of having a certain modularity since the opening created in the seal may be of suitable size and shape, so as to adapt to a particular valve configuration or to the specific characteristics of the fluid line in which they are fitted. Finally, they have the advantage of being low-cost as they require neither an additional part nor complex machining.

Figure 2:
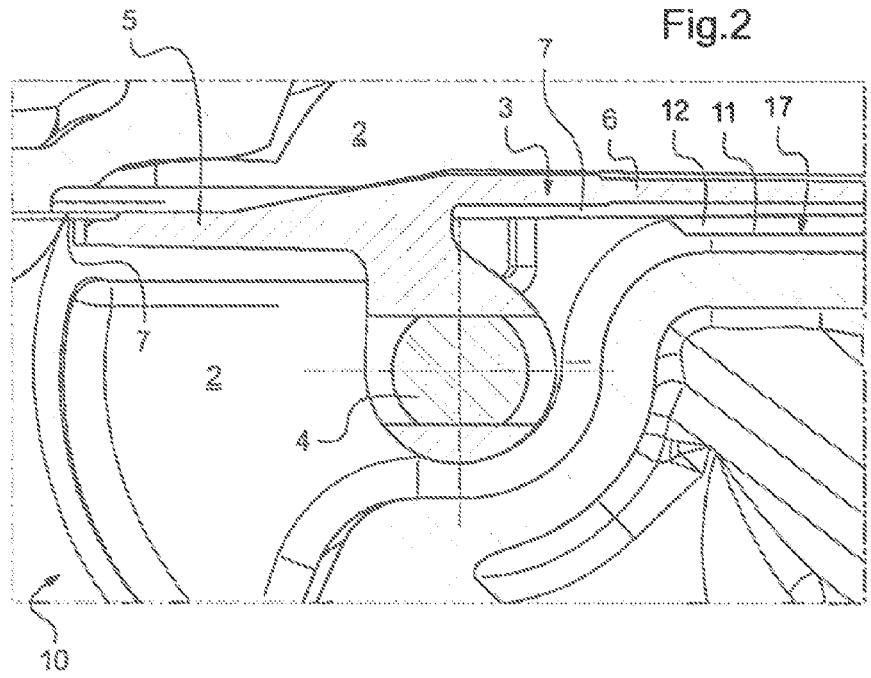
Figure 3:
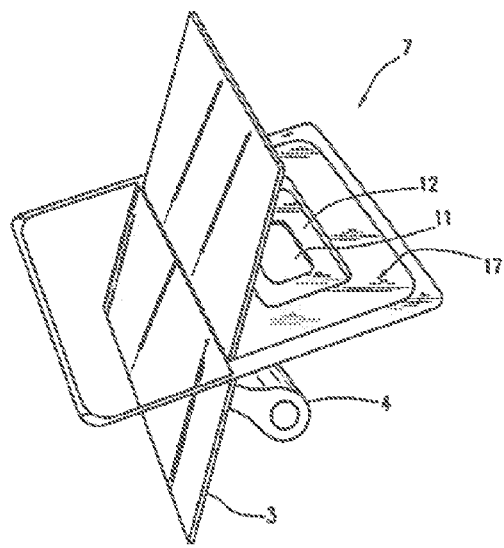
Figure 4:
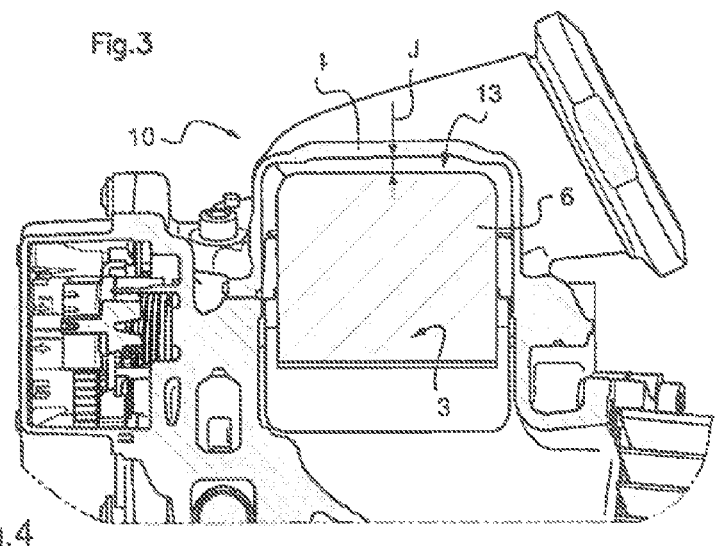
Figure 5:
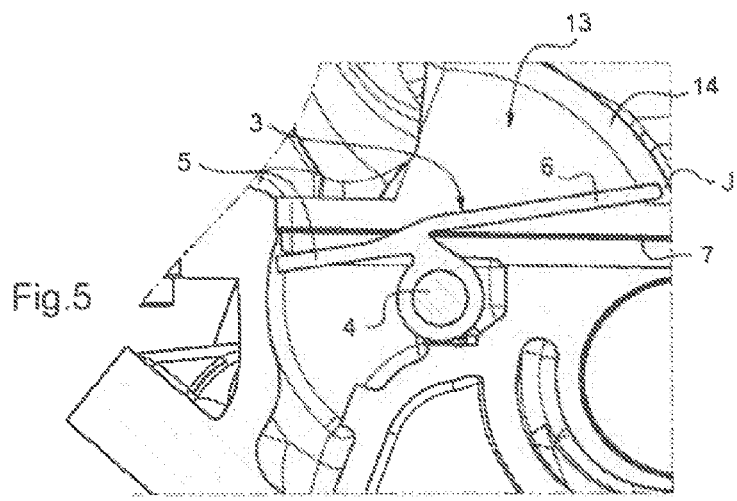

There follows a detailed description of a preferred embodiment of a valve according to the invention, with reference to the appended drawings, in which:

FIG. 1 is a schematic view of the internal structure of a fluid circulation valve according to the prior art, with the flap in a closed position, FIG. 2 is a schematic view of the internal structure of a fluid circulation valve according to the invention, with the flap in a closed position, FIG. 3 is a perspective view of a seal implemented in a valve according to the invention, FIG. 4 is a perspective view of part of a valve according to the invention, with the flap in an open position, FIG. 5 is a side view of the internal structure of a fluid circulation valve according to the invention, with the flap in a slightly open position.

A gas line of a motor vehicle combustion engine comprises an upstream part for supplying gas to said engine, in which part flows, in particular, fresh air, and a downstream exhaust part in which flow burnt gases in order to be expelled from the vehicle. Such a gas line generally comprises at least one EGR (Exhaust Gas Recirculation) loop connecting the downstream exhaust part to the upstream supply part, so as to allow exhaust gases to be mixed with the incoming fresh air. Since these EGR loops should not be permanently open during all phases of operation of the engine, they are each fitted with an EGR valve by means of which it is possible to control the flow of exhaust gases circulating in the loop in question.

With reference to FIG. 1, an EGR valve according to the prior art comprises a gas circulation duct 2 and a flap 3 mounted pivotably on a rotation spindle 4 and able to move between a closed position, in which it prevents the exhaust gases from passing through, and an open position, in which it allows this passage. The flap 3 is mounted on the spindle 4, such that said spindle 4 separates said flap 3 into a first part 5 and a second part 6. Said parts 5, 6 are planar and thin and are positioned such that they are mutually continuous. They preferably form a single piece. These two parts 5, 6 are of identical width, said width being their dimension considered along the rotation spindle 4, while the first part 5 is shorter than the second part 6, the length being their dimension considered along an axis perpendicular to said rotation spindle 4. The first 5 and second 6 parts are rigidly connected to one another, such that they pivot simultaneously about the spindle 4, being positioned at 180° from one another. The internal structure of the valve 1 is configured such that the first part 5 and the second part 6 of the flap 3 come to press against a seal 7 secured to said internal structure when said flap 3 is in the closed position. The arrangement of the flap 3 in the valve 1 is such that the first part 5 of the flap mostly controls the inflow of the gases and the second part 6 of said flap 3 mostly controls the outflow of said gases. Thus, when the flap 3 is in a closed position, the pressures acting on either side of the second part 6 are identical, said second part then being in a state of equilibrium, whereas the gases in the duct 2, upstream of the flap 3, exert considerable pressure on the first part 5 of said flap 3. This results in a pressure difference on either side of said first part 5, which then has a tendency to open in the direction indicated by the arrow 8 and allow gas to pass through. Such a valve 1 is not very fluid tight, and makes the operation of the EGR loop random and not very reliable.

With reference to FIG. 2, a valve 10 according to the invention has undergone a first change with respect to the existing valves 1, so as to prevent the first part 5 of the flap 3 from opening under the pressure of the gases when the flap 3 is in a closed position. This change relates to that part 17 of the seal 7 against which the second part 6 of the flap 3 comes to press in the closed position.

With reference to FIG. 3, this first change consists in creating a hole 11 in said part 17 of the seal 7, so as to generate a pressure drop downstream of the second part 6 of the flap 3. This part 17 of the seal 7 is planar and thin and is of substantially rectangular shape. It has a rectangular central cavity extending parallel to the part 17 of the seal 7, wherein said cavity 12 may be considered similar to a rib. The hole 11 is also of rectangular shape and extends parallel to the rib 12 and to the part 17 of the seal 7. It is created at the base of this rib 12, in a central position. When the flap 3 is in a closed position, its second part 6 comes to press against said part 17 of the seal 7, such that the rib 12 emerges from the part 17 of the seal 7, on the face opposite that against which said second part 6 of the flap 3 comes into contact. In this manner, the hole 11 created in said part 17 of the seal 7 generates a pressure drop downstream of the second part 6 of the flap 3, said second part 6 then having a tendency to clamp itself tightly against said part 17 of the seal 7. This movement tends to oppose that of the first part 5 of the flap 3 such that, in the end, said flap 3 retains a straight profile, by means of which the valve 10 can be closed in a perfectly fluid-tight manner, without any unwanted leakage of gas.

With reference to FIGS. 4 and 5, a valve according to the invention may feature a second change in order to extend the effectiveness of the holed seal 7, when the flap 3 is slightly open, corresponding to positions close to the closed position. Currently, the second part 6 of the flap 3 pivots in a duct 13 of the internal structure of the valve 1 when the flap 3 moves from an open position to a closed position, or vice versa, wherein this pivoting leaves a large clearance J between the wall 14 of said duct 13 and said second part 6 of the flap 3. The clearance J between the second part 6 of the flap 3 and the wall 14 of the duct 13 is conventionally approximately 4 mm. Although this clearance J is necessary, in order to avoid choking the engine when the flap 3 is in an open position, it causes a large passage of air when said flap 3 is in particular in a slightly open position, thus cancelling the pressure drop created by the hole 11 of the seal 7. This once again balances the pressures either side of the second part 6 of the flap, which can then no longer prevent the first part 5 from deforming under the effect of the pressure difference caused by the gases upstream of said first part 5. The flap 3 in a slightly open position then allows an abnormally high flow of gas to pass through at its first part 5, which deforms. This second change thus consists in significantly reducing the clearance J between the perimeter of the second part 6 of the flap 3 and the wall 14 of the duct 13 in which said second part 6 moves. More precisely, the reduction of the clearance J will be achieved by modifying the duct 13, the opening of which is to be reduced, such that the internal wall 14 of said duct 13 becomes closer to the contour of the second part 6 of the flap 3. The clearance J, initially 4 mm, is thus reduced to a value less than or equal to 1.5 mm. This clearance J will preferably be between 0.1 mm and 1.5 mm, and will more precisely be between 0.2 mm and 0.6 mm. With such a reduced clearance J, the flap 3 in a slightly open position will restrict the passage of the gases between its second part 6 and the internal wall 14 of the duct 13, maintaining the full efficacy of the holed seal 7. Thus, in a slightly open position, the second part 6 of the flap 3 will experience a force due to the pressure drop generated by the holed seal 7, this deformation blocking that of the first part 5 of said flap 3, helping to keep the flap 3 in its original overall shape and thus able to carry out effectively its various functions within the valve 10.

The invention claimed is:

1. A fluid circulation valve, comprising:
a body delimiting an internal duct;
a flap mounted pivotally on a spindle, separating the flap into a first part and a second part, the flap being able to pivot between an open position allowing the fluid to pass into the duct, and a closed position which prevents the passage;
a seal, against which the first part and the second part of the flap come to rest in the closed position,
wherein the seal is separated by the spindle into a first part of the seal facing the first part of the flap, and a second part of the seal facing the second part of the flap,
the seal comprising two openings, a first opening on the first part of the seal and allowing the fluid to pass into the duct when the flap is in the open position, and a second opening facing on the second part of the seal and allowing a pressure drop downstream of the second part of the flap when the flap is in the closed position,
the seal further seals the body of the valve in the closed position,
the seal has pressure-lowering means downstream of the second part of the flap so as to increase the force for clamping the second part of the flap against the seal, and
the pressure-lowering means comprising an opening created in the second part of the seal.

2. The valve as claimed in claim 1, wherein
the upper surface of the first part of the flap and the lower surface of the second part of the flap are substantially planar,
the first and second parts of the flap are mutually continuous, and
the first and second parts of the seals are substantially planar.

3. The valve as claimed in claim 1, wherein the opening is created within the second part of the seal thus not causing an opening at the edges of the seal.

4. The valve as claimed in claim 1, wherein the second part of the flap and the second part of the seal are rectangular in shape, and the opening within the second part of the seal is rectangular in shape.

5. The valve as claimed in claim 1, wherein the ratio of the surface area of the opening within the second part of the seal to the total surface area of the seal is between 0.1 and 0.5.

6. The valve as claimed in claim 1, wherein the opening within the second part of the seal is in a central position in the second part of the seal.

7. The valve as claimed in claim 3, wherein the second part of the seal has a cavity and the opening is created in the cavity.

8. The valve as claimed in claim 1, wherein the second part of the flap pivots along a wall of the internal structure of the valve when the flap moves in rotation, and the wall is designed to leave a clearance, with respect to the second part of the flap, which is less than or equal to 1.5 mm.

9. The valve as claimed in claim 8, wherein the clearance is between 0.1 mm and 1.5 mm.

10. The valve as claimed in claim 9, wherein the clearance is between 0.2 mm and 0.6 mm.

* * * * *